United States Patent

[11] 3,599,042

[72] Inventor John R. Andrews, Jr.
 Framingham, Mass.
[21] Appl. No. 872,821
[22] Filed Oct. 31, 1969
[45] Patented Aug. 10, 1971
[73] Assignee Honeywell Inc.
 Minneapolis, Minn.

[54] OVERLOAD PROTECTION DEVICE FOR EMITTER-FOLLOWER LINE DRIVER
10 Claims, 6 Drawing Figs.

[52] U.S. Cl............................................. 317/16,
 317/31, 317/33, 307/202
[51] Int. Cl............................................. H02h 3/08,
 H02h 7/20
[50] Field of Search................................. 307/202,
 214, 254; 317/31, 33, 16

[56] References Cited
UNITED STATES PATENTS
3,163,829 12/1964 Ladd............................ 317/31 X
3,447,035 5/1969 Boykin........................... 317/31

Primary Examiner—J. D. Miller
Assistant Examiner—Harvey Fendelman
Attorneys—Ronald T. Reiling and Fred Jacob ABSTRACT: The invention provides a two-level control for protecting an emitter-follower driver from passing excessive current. The first level is that of enabling a protection circuit provided by the invention whenever the emitter-follower draws current in response to the "on" level of a logic input signal. The second state, or level, of protection occurs when a fault or overload condition occurs which causes the voltage level at the emitter to fall below a predetermined level which could sense an overload or fault condition. If this occurs, the protection circuit of the invention becomes operative and shunts all of the current away from the driver.

PATENTED AUG 10 1971 3,599,042
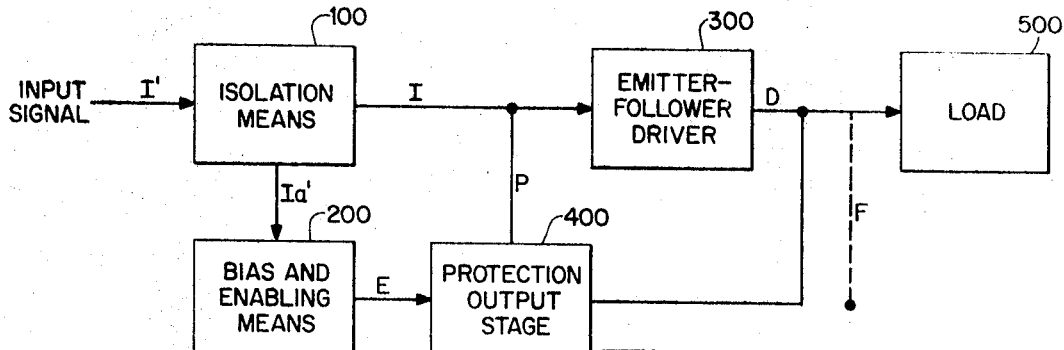
Fig. 1.
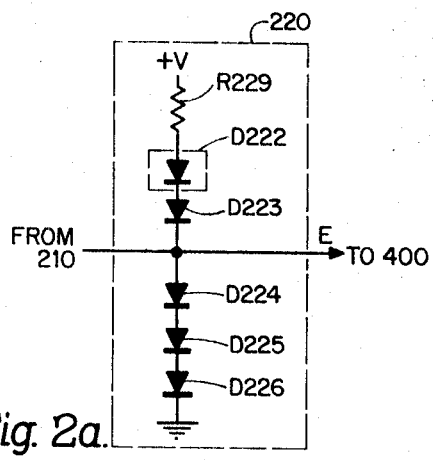
Fig. 1a. Fig. 2a.
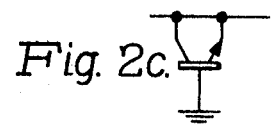
Fig. 2b.
Fig. 2c.
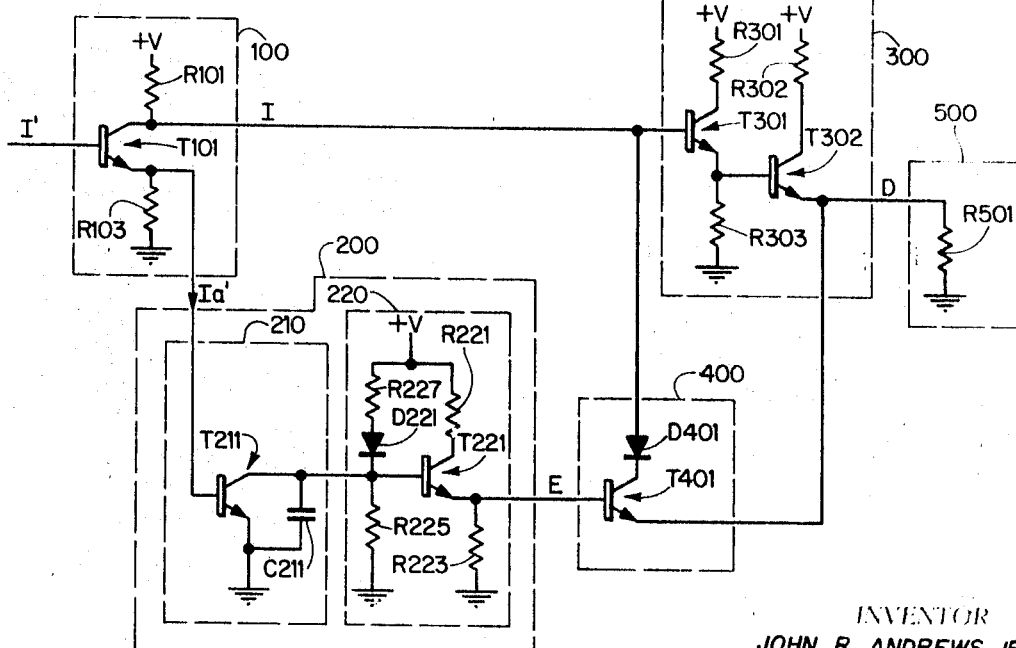
Fig. 2.
INVENTOR
JOHN R. ANDREWS, JR.
BY
Lester S. Hecht
ATTORNEY

OVERLOAD PROTECTION DEVICE FOR EMITTER-FOLLOWER LINE DRIVER

This invention relates to overload protection devices and more particularly, to a device of this type which is used to prevent excessive current from passing through an emitter-follower line driver. In further particularity, the invention provides a two-level protection technique whereby a protection output stage is first enabled after current is passing through the line driver to be protected and then, at the second level, cuts off current through the driver upon the sensing of a fault condition, the excessive current due to the fault being passed through the protection stage.

Many types of protection devices have been provided in the prior art, some specifically related to the protection of line drivers for logic systems. In further particularity, there have been integrated circuits provided which cut off an emitter-follower driver upon occurrence of a fault of overload condition.

The known protection devices of the above-mentioned type have had several disabilities. Firstly, they tend to be overly complex. Secondly, they do not provide for several situations which, after careful analysis, appear to be vitally important in the accomplishment of effective and reliable overload protection.

One thing that known systems have not accomplished effectively is the separation of preparing for protection, from the actual function of protection. More specifically, the prior art has not provided a simple and effective means of enabling the protection circuit only after the proper logical conditions have occurred, but before the actual fault has occurred.

Another disability in known protection systems is that they occasionally supply current to a load when the logic of the system shows that such current should not be supplied.

Accordingly, one of the objects of the present invention is to provide a protection device for a line driver which effectively and efficiently takes into consideration all of the possible states of three circuit variables namely: the state of the logic input signal; the state of the line driver; and the state of the fault condition.

More specifically, it is an object of the invention to provide an integrated circuit which effectively and efficiently provides a protection output stage for an emitter-follower driver and bias and enabling means for controlling said protection output stage to cut off the line driver for the proper conditions.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only and are not intended as a definition of the limits of the invention.

FIG. 1 is a block diagram of a protection device for a line driver according to the invention;

FIG. 1a is a logic diagram or "truth" table depicting the various conditions of a logic input signal, I, a fault condition, F, the current condition of the driver, D, the resulting enabling state for the protection output stage, E, and the state of the protection control signal P;

FIG. 2 is a schematic diagram of one embodiment of the invention;

FIG. 2a is a schematic diagram of an alternate form for circuit 220 shown in FIG. 2; FIG. 2b is a schematic diagram showing an alternate integrated circuit form for the diodes used in embodiments of the invention; and FIG. 2c shows an integrated circuit transistor form suitable for capacitor C211.

Referring now to FIG. 1, it will be noted that an input signal referred to as I' is applied to isolation means 100 which produces an output signal I corresponding to the logical complement of signal I'. Isolation means 100 further includes a noninverting circuit which passes a signal Ia', corresponding directly to I', to bias and enabling means 200. Enabling means 200 produces an output signal E which will be more specifically defined below. Signal E is applied to protection output stage 400 which produces a control signal P applied to the input of line driver 300 which also receives signal I. The output circuit of stage 400 is connected to the output of driver 300, where output signal D corresponds to the condition of the driver as will be explained. The line connects to a load 500 which may exist in many types of utilization devices not forming part of the present disclosure. A dotted line is shown bearing the symbol F to represent a possible fault condition on the line. The significance of, and the relationship among, signals I, F, D, E and P will be considered with reference to both FIGS. 1 and 1a.

Eight possible operating conditions may exist with reference to the states of signal I, condition F, and signal condition D. Starting from row (1) of FIG. 1a, we note that if all signals are "off" or 0, the system is in a condition where the logic input signal I represents an "off" state so that no current is to be supplied to load 500. It is assumed that in this case there is no fault, but if there were, as in case (3), no action would be required. Thus cases (1) and (3) are the same except for the condition of the fault. In case (2), only the driver output signal D is purported to be "on." This case is not permitted because, by definition, the driver is not permitted to conduct current when the input signal I=0. In case (4) a similar nonpermissible case is expressed where both the fault condition F and the driver are "on." Since cases (2) and (4) cannot occur, no values are given for E and P. Case (5) represents a situation which many protection systems do not properly account for, where the input signal is "on" but the driver signal D is still 0. If the protection circuit were enabled under this condition, current would be supplied from the protection output stage which would disable the proper functioning of the line driver. Therefore, case (5) is an important situation to consider with respect to the proper functioning of the present invention.

In case (6) both the driver and the logical input signal are "on," and therefore, protection circuit 400 may be enabled but no protection is yet required because a fault F is not present. In case (7) we have the situation of case (5) where the logical input signal is "on," but the driver is not. Care must thus be taken for both cases (5) and (7) to prevent enabling of the protection device. It may be noted that, since the driver is not conducting current in this case, no protection is really required. In case (8) we have the only situation where protection is actually required. Here the driver has already responded to the input signal "on" state and a fault F has occurred. Thus enabling means 200 functions to produce the proper level of signal E, and protection output stage 400 functions to then cut off driver 300 and shunt the excessive fault current away from the driver.

Reference is now made to FIG. 2 where a transistor T101 is shown having a collector electrode providing an inverted output signal I, corresponding to the complement of the input signal I'. A standard pullup resistor R101 connects the collector of T101 to a suitable pullup voltage represented as +V. The emitter of transistor T101 is connected to a resistor R103 which provides an output signal Ia' in phase with the input signal I'. Signal I is applied to a first transistor T301 in circuit 300 having a collector pullup resistor R301 receiving +V, and an emitter resistor R303 which is grounded. The emitter of transistor T301 is connected to the base of a second transistor T302 having a collector pullup resistor R302 also receiving +V. Transistor T302 provides the emitter-follower output stage for driving the line, and thus the emitter of this transistor provides output signal D. Load 500 is shown as including a resistor R501 to represent a typical resistive load.

In protection circuit 400, a transistor T401 is shown which has its emitter connected to the emitter of T302. Circuit 400 also includes a diode D401 having its cathode connected to the collector of transistor T401 and its anode connected to the base of T301. The base of T401 receives signal E, representing the enable function mentioned above. Signal E is provided by circuit 200 by means of a circuit therein referenced as 220, one specific form of which is shown in FIG. 2 and an alternate form of which is shown in FIG. 2a.

Signal I', derived through transistor T101, is applied to a circuit 210 forming part of means 200. Specifically, a semiconductor device such as transistor T211 receives a signal I' at its base. The emitter of T211 is connected to ground and the collector thereof is connected through capacitor C211 to ground. An integrated circuit form of capacitor C211 is shown in FIG. 2c c. The collector of T211 is also applied to the input of circuit 220 which is shown, in the case of FIG. 2, to include a semiconductor device such as transistor T221 having its collector connected through resistor R221 to potential +V, and its emitter connected through resistor R223 to ground. The emitter of T221 provides signal E which is applied to circuit 400.

The base of transistor T221 is connected to ground through a resistor R225 and to the cathode of a semiconductor device such as diode D221, the anode of which is connected through resistor R227 to potential +V.

The operation of the circuit of FIG. 2 will be considered with reference being made again to FIG. 1a. When input signal I is "off" corresponding to the "on" level of complementary input signal I', applied to the base transistor T101, T101 is caused to conduct. This means that the "off" level of signal I approaches ground potential and thus cuts off the conduction of transistor T301 in circuit 300. This action causes the cutting off of transistor T302 so that no current is supplied to load 500, and the system is in state (1) of the FIG. 1a.

When signal I is "off," signal I' is "on," because the conducting state of transistor T101 causes the potential across resistor R103 to rise. This voltage increase is effective to turn on transistor T211 and, after a delay which will be further explained below, the potential of the base of transistor T221 is lowered. The result of this action is that transistor T221 is cut off and, therefore, the signal E is disabled so that transistor T401, in protection circuit 400, cannot be caused to conduct by the occurrence of a fault. This corresponds to state (3) of FIG. 1a.

The other two states (2) and (4) of FIG. 1a have been previously noted to be impossible since they imply that driver signal D is "on" even though input signal I is "off."

The next series of states to be considered with specific reference to FIG. 2, are (5) through (8) of FIG. 1a. In these cases signal I assumed its "on" or high level. This means that signal I' must represent logical 0. When signal I assumes a relatively high positive level at the collector of transistor T101, it causes transistor T301 to conduct which, in turn, causes transistor T302 to conduct causing line driver signal D to assume its "on" condition.

When signal I is applied to the base of T301, signal I' is applied to the base of transistor T211. It is at this time that the action of capacitor C211 becomes important. The delay in charging capacitor C211 to a high level in response to the cutoff of transistor T211 delays the driving of transistor T221 into conduction. Thus, the enable signal E which results therefrom cannot occur before signal D is "on." This then prevents the enabling in case (5) of signal E before signal D is "on."

At this point it is significant to consider how the "on" or enabling level of signal E should be selected. The purpose of the "on" state of signal E is to forward-bias transistor T401 only in the fault-occurring sense. That is, potential E when "on" is not sufficient to cause conduction of transistor T401 unless a fault condition has occurred which has pulled the voltage level at the emitter of T302 down to the danger level.

Thus, from a logical point of view, transistor T401 is not permitted to pass current unless, firstly, signal D is "on," and, secondly, a fault is present.

If this occurs, the system has entered case (8) of FIG. 1a. It is only in this case that enable signal E is "on," and protection circuit 400 becomes operative.

When protection circuit 400 becomes operative, in this manner, transistor T401 conducts and the collector thereof assumes a level which is slightly higher than the level of the fault. This condition is assumed to correspond to the "on" state of signal P appearing at the collector of T401. Resistors R301 and R303 are selected such that transistor T301 is cut off when signal P is "on." After T301 is cut off in this manner T302 is then also cut off to terminate the passing of current to the line.

Transistor T401 cannot be overloaded because it receives its collector current through resistor R101 selected to be high enough to provide the necessary protection. From a logic point of view, the function of the circuit of FIG. 2 is simply to enable the protection circuit only after the line driver is conducting and to cause the protective operation of circuit 400 only after the fault condition occurs.

An alternate circuit which may be used in the place of circuit 220 in FIG. 2 is shown in FIG. 2a. In this case the enabling signal is derived from a network which includes a resistor R229 supplying +V potential to the anode of a diode D221 having its cathode connected to the anode of a diode D223. The cathode of diode D223 provides the output signal E and is connected to the anode of diode D224, the cathode of which connects to the anode of diode D225. The cathode of D225 connects to the anode of diode D226, the cathode of which is connected to ground. The function of this alternative circuit is simply to transform the signal derived from the collector of transistor T211 into a two-state signal where, when transistor T211 is "on" E is approximately at ground level; whereas when transistor T211 is "off" E assumes the predetermined bias level defined above.

Although diodes have been shown in conventional form, in actual integrated circuit practice they may appear as shown in FIG. 2b. In this case, by connecting the base and collector electrodes together only a single diode element is left. Capacitor C211 is shown in integrated circuit form in FIG. 2c, where the collector and emitter electrodes are connected and the base is connected to ground. Capacitance is derived from the electrode junctions in a now well-known manner.

It may be desired to provide a more direct association between signal D and signal E, avoiding the use of a delay such as capacitor C211. In this case a coupling may be made between the collector of transistor T302 to the base of transistor T211, removing any other connection thereto as shown in FIG. 2. This coupling should be made through a voltage-dropping circuit, such as a series of diodes, so that when transistor T302 is conducting, and pulls the collector thereof to a lower level, there is insufficient voltage to cause the conduction of transistor T211. This results in the enabling of transistor T401. Since the collector of transistor T302 can only assume this reduced voltage state after the conduction has begun, the desired relationship between D and E is obtained for this condition. When signal D is in the "off" state, the voltage at the collector of T302 assumes a level corresponding to +V, which is then sufficient to cause the conduction of transistor T211 and thus disables signal E.

One specific technique in detailed circuitry has been explained to show an operating embodiment of the invention. It cannot be definitely stated that this is the preferred embodiment of the invention in view of the many different environments in which a line driver must operate. Accordingly, preference in the practice of the invention must be defined in terms of FIG. 1a where logical conditions are clearly set forth which must be satisfied for the proper operation of the invention.

I claim:

1 An overload protection device for an emitter-follower driver comprising: a protection output stage having its output coupled to the output of the emitter-follower driver, said output stage having a control circuit coupled to the input of said emitter-follower driver and having an input circuit adapted to receive a bias and enabling signal; bias and enabling means for receiving an input signal and producing an enabling signal having a predetermined bias level; and means for isolating the input circuit of said emitter-follower driver from said bias and enabling means; said bias and enabling means including circuits for establishing said predetermined bias level and for enabling said protection output stage to pass current only when said driver is passing current in response to an input signal having an "on" level and when an overload condition is sensed by said protection output circuit which causes the voltage at the output of said driver to fall below said predetermined bias level.

2. In a logic driver system wherein an "on" level of an input signal is employed to cause conduction of an emitter-follower line driver thereby passing current to a load, and the "off" level of the input signal is employed to cut off conduction of said line driver, an overload protection circuit for cutting off current conduction through said line driver only after current is passed through said line driver and the voltage across said load falls below a predetermined fault level, said protection circuit comprising transistor means for receiving said input signal and producing a bias-enabling signal having an enabling level when said input signal is "on" and a disabling level when said input signal is "off"; and second means having an input circuit for receiving said bias-enabling signal, an output circuit coupled to said load, and a control circuit coupled to said line driver; the enabling level of said bias-enabling signal being selected to exceed said fault level by an amount sufficient to forward bias said second means upon occurrence of a fault and said control circuit being operative to terminate conduction through said line driver.

3. An improved line driver comprising: a logic signal input circuit; an output stage for providing a low impedance path for current flow to a load in response to an "on" condition of said logic signal; an enabling device including circuits for establishing an enabling signal having a predetermined bias level only when said output stage is supplying current to said load; and a protection device responsive to said enabling signal for shunting excessive current away from said output stage upon occurrence of a fault which pulls the voltage across said load to a level below said predetermined bias level.

4. In combination: transistor means for receiving an input signal and providing a bias-enabling signal having an enabling level when an input signal is "on" and a disabling level when said input signal is "off"; a first transistor having a first emitter coupled to a load; a second transistor having its emitter coupled to said load and to said first transistor and protection means electronically coupled to said transistor means and to said first and second transistors said protection means operative whenever current is supplied through said first emitter to said load for establishing a forward bias for said second transistor such that the occurrence of a fault which pulls the output voltage at said first emitter below said forward bias will cause the conduction of said second transistor and cut off conduction through said first transistor.

5. In combination with a logic driver system wherein an "on" level of an input signal is employed to cause conduction of an emitter-follower line driver thereby passing current to a load, and the "off" level of the input signal is employed to cut off conduction of said line driver, an overload protection circuit for cutting off current conduction through said line driver only after current is passed through said line driver and the voltage across said load falls below a predetermined fault level comprising:

a. first means for receiving said input signals and producing a bias-enabling signal having an enabling level when said input signal is "on" and a disabling level when said input signal is "off";

b. a first transistor having a first emitter electrically coupled to a load;

c. a second transistor having its emitter electrically coupled to said load and to said first transistor; and d. protection means electrically coupled to said first means and to said first and second transistor, said protection means operative whenever current is supplied through said first emitter to said load for establishing a forward bias for said second transistor such that the occurrence of a fault which pulls the output voltage at said first emitter below said forward bias will cause the conduction of said second transistor and cut off conduction through said first transistor, and wherein said protection means includes a first circuit responsive to said "on" input signal to develop a preliminary bias signal, and a second circuit responsive to said preliminary bias signal for producing said forward bias after a predetermined delay sufficient to insure that current is first supplied to said load.

6. The combination defined in claim 5 wherein said protection means includes a direct coupling between said first transistor and a third transistor such that whenever current is supplied through said first transistor said third transistor is caused to generate a signal representing said forward bias.

7. The combination defined in claim 5 wherein said protection means includes an enabling-bias circuit for producing a signal E having a disabling level when said first transistor is nonconducting and having an enabling level when said first transistor is conducting.

8. The combination defined in claim 7 wherein said enabling-bias circuit includes at least one diode or equivalent thereof, and one transistor.

9. The combination defined in claim 7 wherein said enabling-bias circuit is comprised substantially of semiconductor devices.

10. A logic driver for supplying current to a load in response to an input signal I, the current-present condition of said driver being represented by signal D, said logic driver comprising: isolation means for receiving an input signal I' and producing output signal I; bias and enabling means for receiving a signal corresponding to signal I' and producing an enable-disable signal E; a protection stage for receiving signal E and producing a protection control signal P, said protection stage having an output circuit coupled to the output circuit of said driver; and means responsive to a fault condition represented by F and to enable-disable signal E for cutting off current conduction through said logic driver, the interconnections and circuits in each of the aforementioned means being specifically mechanized according to the following logical definition to cut off current flow through the driver in the event of a fault condition represented by the "on" state of condition F:

|     | I | F | D | E | P |
|-----|---|---|---|---|---|
| (1) | 0 | 0 | 0 | 0 | 0 |
| (2) | 0 | 0 | 1 | X | X |
| (3) | 0 | 1 | 0 | 0 | 0 |
| (4) | 0 | 1 | 1 | X | X |
| (5) | 1 | 0 | 0 | 0 | 0 |
| (6) | 1 | 0 | 1 | 1 | 0 |
| (7) | 1 | 1 | 0 | 0 | 0 |
| (8) | 1 | 1 | 1 | 1 | 1 |

UNITED STATES PATENT OFFICE
CERTIFICATE OF CORRECTION

Patent No. 3,599,042            Dated August 10, 1971

Inventor(s) John R. Andrews, Jr.

It is certified that error appears in the above-identified patent and that said Letters Patent are hereby corrected as shown below:

On the cover sheet, in the Abstract, line 9, "sense" should read -- cause --.

Signed and sealed this 29th day of August 1972.

(SEAL)
Attest:

EDWARD M. FLETCHER, JR.            ROBERT GOTTSCHALK
Attesting Officer                    Commissioner of Patents